(12) United States Patent
Fink et al.

(10) Patent No.: US 7,886,607 B2
(45) Date of Patent: Feb. 15, 2011

(54) PACKAGE FOR STRAIN SENSOR

(75) Inventors: Thomas Fink, Landshut (DE);
Raymond Lohr, Buke (GB)

(73) Assignee: Schott Ag, Mainz (DE)

( * ) Notice: Subject to any disclaimer, the term of this patent is extended or adjusted under 35 U.S.C. 154(b) by 57 days.

(21) Appl. No.: 12/260,128

(22) Filed: Oct. 29, 2008

(65) Prior Publication Data

US 2009/0115010 A1 May 7, 2009

Related U.S. Application Data

(60) Provisional application No. 60/984,757, filed on Nov. 2, 2007, provisional application No. 60/988,474, filed on Nov. 16, 2007.

(30) Foreign Application Priority Data

Oct. 29, 2007 (EP) .................... 07021086

(51) Int. Cl.
*G01L 13/02* (2006.01)
(52) U.S. Cl. ....................................... 73/716
(58) Field of Classification Search ........................ None
See application file for complete search history.

(56) References Cited

U.S. PATENT DOCUMENTS

| 4,213,104 A | * | 7/1980 | Cullen et al. ............... 333/150 |
| 4,422,055 A | * | 12/1983 | Cullen et al. ............... 333/151 |
| 5,573,088 A | * | 11/1996 | Daniels ..................... 188/267 |
| 5,585,571 A | | 12/1996 | Lonsdale et al. |
| 7,193,362 B2 | | 3/2007 | Kato et al. |
| 2006/0104561 A1 | * | 5/2006 | Ivtsenkov .................... 385/13 |
| 2006/0123913 A1 | * | 6/2006 | Marsh ....................... 73/626 |
| 2006/0130585 A1 | | 6/2006 | Magee et al. |
| 2008/0233370 A1 | * | 9/2008 | Nakao et al. ............... 428/210 |
| 2009/0100935 A1 | * | 4/2009 | Leigh et al. ................. 73/596 |
| 2009/0107236 A1 | * | 4/2009 | Lohr et al. .................. 73/431 |

FOREIGN PATENT DOCUMENTS

| GB | 2346493 A | 9/2000 |
| GB | 2 361 318 | 10/2001 |

OTHER PUBLICATIONS

"Precision Strain Gages" Vishay Micro-Measurements, [Online] vol. Catalog No. 500, Sep. 3, 2006, XP002514895.

* cited by examiner

*Primary Examiner*—Andre J Allen
(74) *Attorney, Agent, or Firm*—Taylor IP

(57) ABSTRACT

The invention relates to a package for a strain sensor. The package includes a base part (10) from a strain hardened material, a central part (20) from an annealed material which carries glass fritted leadthroughs, and a lid part (30), wherein the base part, the central part and the lid part are made from austenitic stainless steel AISI 304L as well as a method for producing such a package.

40 Claims, 4 Drawing Sheets

PACKAGE FOR STRAIN SENSOR

CROSS REFERENCE TO RELATED APPLICATIONS

This is a non-provisional application based upon U.S. provisional patent application Ser. No. 60/984,757, entitled "PACKAGE FOR STRAIN SENSOR", filed Nov. 2, 2007 and U.S. provisional patent application Ser. No. 60/988,474, entitled "PACKAGE FOR STRAIN SENSOR", filed Nov. 16, 2007, which is incorporated herein by reference.

BACKGROUND OF THE INVENTION

1. Field of the Invention

The invention relates to a package for a strain sensor.

2. Description of the Related Art

Many applications call for strain measurements relating to static and dynamic loading of structures and components and for the subsequent derivation of information from such measurements. From U.S. Pat. No. 5,585,571 a method and apparatus for measuring strain has been made known. The method and apparatus for measuring strain as described in U.S. Pat. No. 5,585,571 is based on a so-called surface acoustic wave resonator (SAW-resonator). Such a resonator is made up of a microstructure deposited on a piezoelectric substrate. The microstructure is formed by at least one pair of interleaved comb-like ("interdigitated") electrodes deposited as a thin metal conducting layer on a substrate. In FIGS. 5 and 6 a basic model of a one port surface acoustic wave resonator used as a strain sensor is shown.

The strain sensor on basis of a surface acoustic wave (SAW) resonator is described now in further detail. The resonator has at least one interdigital transducer (IDT) with two electrical terminals and it may also contain two reflecting periodic gratings positioned one on each side of the transducer. The RF signal from the signal source applied to the IDT terminal excites surface acoustic waves propagating in opposite directions. As a result of reflections of SAW from the gratings a resonance with a very high quality (Q) factor (of the order of 10,000) occurs at the frequency of several hundred megahertz. The resonant frequency of the SAW resonator can be measured in a contactless way by an electronic interrogation unit. In the event that the substrate of the SAW resonator is subject to strain, the periods of the gratings and the IDT change and the SAW propagation velocity also changes proportionally to the strain value. As a result, the resonant frequency also changes proportionally to the strain. By measuring the change in the SAW resonant frequency one can measure the strain. The SAW strain sensing element may contain several electrically connected SAW resonators in order to exclude or compensate for the influence of temperature, the variation of electric parameters of the RF communication channel and some undesirable mechanical forces. In particular, when measuring torque applied to a shaft by way of measuring the direct strain components (tension and compression) of the shear strain on its surface, there may be two SAW resonators positioned on a single substrate at 45° to the shaft axis. In this case the difference between the two resonant frequencies is proportional to the torque value.

A third SAW resonator may also be positioned on the same single substrate in order to sense temperature, thereby permitting temperature compensated torque to be determined from a single SAW sensor.

The operational frequencies of an SAW resonator can be selected in a wide frequency range extending from a few megahertz up to a few gigahertz. The SAW resonator can be operated in many different modes as described for example in U.S. Pat. No. 5,585,571 whose content is fully incorporated in this application by reference. The choice of the operating mode depends on the strain measurement which should be undertaken.

In order to prevent the SAW substrate from environmental harm, the SAW substrate should be enclosed within a hermetic package. According to the state of the art, SAW substrates are packaged in hermetic packages consisting of two pieces made from materials such as austenitic stainless steel. The two pieces included a flat base part and a top head part, which are assembled together, for example by welding. The packages furthermore also have an electrical leadthrough, which is made hermetic by use of a glass fritted seal. The glass fritted seal functions either by a difference in the expansion coefficient, known as a compression seal, or by bonding to a preoxidized surface layer known as a matched seal. The compression seal is normally used in austenitic stainless steel packages, whereas the matched seal is used in a nickel-cobalt ferrous alloy such as KOVAR® packages.

In the state of the art, the SAW substrate used in a strain sensor is die bonded to the base part of the package. The base part is then bonded or welded to the component from which the strain should be determined. For determining the strain, it is necessary, that the strain is transferred from the component by way of the base part onto which the SAW substrate is bonded to the SAW resonator or resonators elastically, i.e. without hysteresis, plastic or creep deformation.

The two piece packages suffer from the problems that either they have poor elastic properties or that the glass fritted compression seal, throughwhich the leadthroughs are guided, cracks.

From US Patent Application Publication No. 2006/0130585 A1 a package for a torque SAW resonator has been made known. The package system made known from US 2006/0130585 A1 is designed to maximize the strain in the torque SAW resonator. The base part of the package is made from a high strength stainless steel, whereas the package wall is formed from a more flexible stainless steel. A disadvantage of this package is that the term "flexible" is not defined. All steels, whether martensitic, austenitic or precipitation hardening have a similar Young's (E) Modulus of around 200 GPa which defines the slope of the elastic stress-strain line and therefore the intrinsic elastic stiffness of the material. In addition US 2006/0130585 describes neither the stress-strain state of the materials indicated nor the manufacturing process, both of which are critical.

From U.S. Pat. Nos. 4,213,104 and 4,422,055 surface acoustic wave devices have been made known. The package of the devices shown in U.S. Pat. Nos. 4,213,104 and 4,422,055 include a base, which is the SAW substrate material, a spacer and a cover. In U.S. Pat. No. 4,213,104, all parts are made are made from a material having substantially the same thermal expansion characteristics and crystallographic orientation. Since the requirements for a SAW substrate are a piezo-electric crystalline material, such as quartz, this package is characteristic of an "all quartz" package.

In U.S. Pat. No. 4,422,055, a cut (circular slot) is introduced which surrounds the SAW couplers in order to isolate them from external strains.

In GB 2,346,493 a package for a strain sensor is disclosed. As in U.S. Pat. Nos. 4,213,104 and 4,422,055 the base (SAW substrate material) is quartz as is the lid. The central part is a thin window of adhesive film, so that this is another design approach to an "all quartz" package.

"All quartz" packages have potential cost advantages, however their intrinsic brittle nature (no capacity for inelastic deformation) means they are less tolerant of mechanical shock and cannot be attached to a structural component by means such as welding which are desirable for high volume automotive applications.

It is therefore an object of the invention to provide a package for a strain sensor which avoids the disadvantages mentioned in the state of the art. Especially a package for a strain sensor should be provided which can be mounted to a structural component so that good mechanical coupling is provided enabling elastic strain transfer to the SAW substrate which is bonded inside the package.

SUMMARY OF THE INVENTION

The present invention deals with a three-part metallic package into which is bonded a piezo-electric substrate on which SAW resonators are fabricated. The design, material and manufacturing processes involved are fundamentally different to those described in U.S. Pat. No. 4,213,104.

The problems discussed above are solved by an embodiment of a package of the present invention, which consists of at least three elements or parts, a base part, a central part and a lid part, wherein the central part is made from an annealed material and the base part is made from a material which is flexible. In order to have a good reproducibility, the inventors have found out that the material of the base part must have good elastic properties. Materials of good elastic properties for the base part are materials having essentially linear elasticity and a high yield strain. The yield strain describes the limit of elastic deformation of a material. By defining a high yield strain for the base part, a major benefit for the measurement performance of the final complete strain sensor system, comprising the package and the strain sensor enclosed in this package and attached to the base part, can be achieved in terms of low hysteresis and creep. Preferably the yield strain (limit of elastic deformation) of the material of the base plate is chosen to be more than 2000 microstrain (0.20% strain), most preferably more than 2,500 microstrain (0.25% strain).

Examples of materials achieving such a high yield strain are strain hardened (cold rolled) austenitic stainless steels such as AISI 304 and hardened martensitic stainless steels such as AISI 420, 17-4 PH (precipitation hardening) or 17-7 PH (precipitation hardening).

In a preferred embodiment of the present invention, all three parts of the package are made of metallic components and the strain sensor in form of a piezo-electric die is bonded to the base part. Most preferably all three metallic components are made of the same material with regard to the coefficient thermal expansion (CTE). If all three metallic components have the same CTE, then thermal strains due to temperature change can be eliminated. In a more preferred embodiment the base part consists of a strain hardened austenitic stainless steel and the central part is made from annealed austenitic stainless steel. The lid part can be made either from strain hardened stainless steel or from annealed stainless steel. In the most preferred embodiment all three parts can be made of the same material, for example the base part, the central part and the lid part can be made from austenitic stainless steel.

For the central part it is important that the material is appropriate to glass fritting electrical leadthroughs by the compression seal process.

Preferred austenitic stainless steels are AISI 304 and AISI 316. Most preferred are austenitic stainless steels with a low carbon content, such as AISI 304L or AISI 316L, which are better suited to welding, in particular laser-welding, by virtue of lower embrittlement in the heat affected zone (HAZ) and, as a result, a lower propensity to cracking.

By dividing the package for a strain sensor into three parts, it is possible, to glass frit the electrical leadthrough, for example in the form of a compression seal, at an elevated temperature without affecting the elastic properties of the base part onto which the SAW substrate is mounted. In order to glass frit the electrical leadthroughs, temperatures of more than 1,000° C. are used. When the central part is heated to such temperatures, irrespective of the stainless steel selected, it will become annealed and its elastic properties, especially yield strain, will be much reduced.

By first manufacturing the central part with the glass fritted compression seal at high temperatures of approximately 1,000° C., the elastic properties of the separate base part us not compromised. The glass fritted compression seal can be manufactured in a temperature range preferably between 800° C. and 1,100° C., preferred between 900° C. and 1,050° C. and most preferred between 950° C. and 1,020° C. A steel, which is temperature processed in this temperature region, will in general become annealed.

Since only the central part is annealed, only this central part made from austenitic stainless steel loses its elastic properties, whereas the elastic properties of the base part, made of strain hardened (cold rolled) austenitic stainless steel, can be retained because it is not annealed.

Since the base part is made from a strain hardened austenitic stainless steel, the SAW substrate can be mounted onto the base part and the strain from outside the package will transfer to the SAW resonator or resonators by way of the strain hardened austenitic base part elastically, i.e. without hysteresis, plastic or creep deformation.

The use of austenitic stainless steel as a package material provides for high resistance to oxidation and corrosion. Furthermore, austenitic stainless steel provides for a package material which can be joined successfully together by welding or bonding. Furthermore, the use of austenitic stainless steel as a material for the package provides hermetic electrical leadthroughs, when used together with a compression sealing technique.

Within a temperature range from −40° C. to 150° C., the austenitic stainless steel can provide a high elastic yield strain of 2,500 microstrain or more as a strain hardened (cold rolled) material.

The invention not only provides for an improved package for a strain sensor that includes at least three parts with the central part having the leadthroughs, but also for an improved method of producing a package for a strain sensor, having at least a base part, a central part and a lid part.

According to the inventive method in the first step includes producing the hermetic package, the leadthrough is glass fritted to the central part, for example by a temperature of approximately more than 1,000° C. to provide for a compression seal due to differences of the expansion coefficients of the glass material and the austenitic stainless steel material.

After the leadthrough is glass fritted to the central part at a high temperature, the central part is attached to the base part at a much lower temperatures, for example by bonding or welding. Preferred welding processes include resistance welding, laser welding, electron beam welding or seam welding. The base part is normally a flat component. If the central part is attached to the base part by welding then one has to ensure, that the heat affected zone (HAZ) due to the weld is small and does not extend into the region of the base part where the SAW-resonator will be bonded.

After the central part is attached, to the base part by bonding or welding, the SAW substrate is mounted onto the base part. For mounting the SAW substrate (a piezo-electric die) onto the base part, a high strength, high glass transition temperature (Tg), adhesive is used to ensure low hysteresis and low creep.

After the SAW substrate is mounted onto the base part, the SAW resonator or resonators are electrically connected to the electrical leadthroughs, for example by a gold wire bonding process.

After the aforementioned steps are completed the package is closed by attaching the lid part to the central part. The SAW substrate, including SAW resonators, is then totally hermetically encapsulated.

A further advantage of the present invention is that it makes no use of a cut in order to isolate the SAW couplers from external strains. According to the present invention the purpose of the base is to couple the external strains in the whole of the base into the piezo-electric substrate which is bonded to it.

BRIEF DESCRIPTION OF THE DRAWINGS

The invention will now be described with regard to the pictures. The pictures are only embodiments of the invention. The invention is not restricted to the embodiments shown in the figures.

Corresponding reference characters indicate corresponding parts throughout the several views. The exemplification set out herein illustrates embodiments of the invention and such exemplifications are not to be construed as limiting the scope of the invention in any manner.

DETAILED DESCRIPTION OF THE INVENTION

Figure 1:
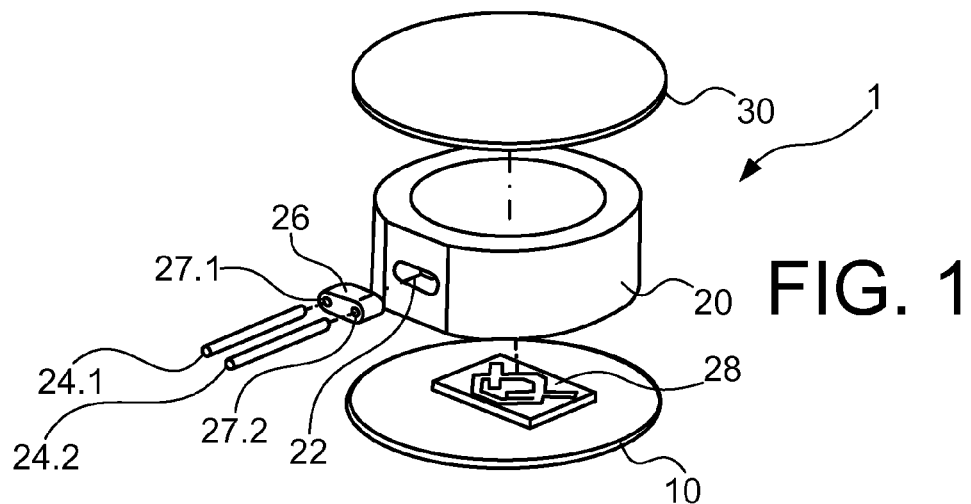
FIG. 1 is an exploded view of a package according to an embodiment of the present invention.

Referring now to the drawings, and more particularly to FIG. 1 there is shown an exploded view of the different parts of a package for a strain sensor according to the present invention.

The package includes three main parts, a base part 10, which is shown in this embodiment as a flat plate, a central part 20, which is shown in the embodiment in a ring shaped form and a lid or upper part 30.

Base part 10 has to be made from a material with a linear elastic behavior and a high yield strain in order to ensure a linear response from the sensor with minimal hysteresis and creep.

Central part 20 requires a material suitable for glass fritting, which involves temperatures over 1000° C. Such temperatures will anneal out (substantially reduce) the elastic range of ferritic/martensitic steels induced by hardening and tempering or of austenitic steels by cold working. In addition the material of the central part must be readily weldable or bondable to the base part.

The lid part 30 is readily weldable or bondable to the central part. Preferably the base, central and lid parts should be made of materials with similar coefficients of thermal expansion (CTE), and good resistance to oxidation and corrosion.

The thickness of the base and lid parts and the wall thickness of the central part should be as thin as practically possible, e.g. 0.1 to 1 mm and preferably 0.2 to 0.6 mm, in order to reduce the mechanical stiffness of the package. Reducing the package stiffness reduces the stress level in the bonded or welded connection between the package and the component on which the strain is to be measured, which benefits the durability of the SAW sensor system.

Base part 10, central part 20 as well as lid part 30 are all made, in a most preferred embodiment, of the same material, which is most preferred austenitic stainless steel, for example austenitic stainless steel AISI 304. Most preferred is austenitic steel AISI 304L. Central part 20 is made of annealed austenitic stainless steal, whereas base part 10 is made of a strain hardened (cold rolled) austenitic stainless steel. The annealed austenitic stainless steel is ideal for glass fritting, whereas the cold worked austenitic stainless steel has a high yield strain. Such an embodiment consisting mainly of austenitic steel provides for a similar thermal expansion coefficient (CTE) for all of the different parts of the package.

The use of the same material for all of the parts of the hermetic package has the benefit that for all package elements a common coefficient of thermal expansion (CTE) with good oxidation and corrosion resistance properties results.

Central part 20 of package 1 includes an opening 22 that accommodates the leadthroughs 24.1 and 24.2 from the outside of the package into its interior.

In opening 22 a glass part 26 is introduced. Glass part 26 has the same form as the opening 22 of central part 20. Furthermore, glass part 26 includes two openings 28.1 and 28.2 through which leadthroughs 24.1 and 24.2 are fed.

After glass part 26, together with leadthroughs 24.1 and 24.2 are introduced into the opening 22 of central part 20, central part 20 is heated to a temperature of around 1,000° C., melting the glass 26, which in turn adheres to leadthroughs 24.1 and 24.2 and the wall of the central part 20. When the assembly is cooled from the high temperature of around 1000° C. down to room temperature, the glass solidifies. Then, due to the higher expansion coefficient (CTE) of the material of central part 20 as compared with the CTE of the glass frit material, a compressive stress is developed which in turn ensures a hermetic seal of the leadthroughs 24.1 and 24.2, glass part 22 and central part 20. Such a glass fritted seal is known as a compression seal.

The next step is to attach central part 20 to base part 10 and thereby form an intermediate assembly. The attachment of central part 20 to base part 10 can be made by different techniques. A first alternative is welding with a suitable process like laser welding. Another technique is the bonding technique. Both techniques are well known for a person skilled in the art. Apart from laser welding there is also the possibility of resistance welding, press-fit welding and cold welding. Also soldering would be possible. The interconnection of central part 20 to base part 10 by welding techniques, bonding techniques or soldering leads to a hermetic interconnection or attachment which is also vacuum tight.

After central part 20, including leadthroughs 24.1 and 24.2, is attached to base part 10, SAW substrate 28 (typically crystalline quartz) incorporating up to three SAW resonators is bonded to base part 10. In order to attach SAW substrate 28 to base plate 10, a high glass transition temperature ($T_g$) adhesive is utilized to ensure low hysteresis and creep.

After SAW substrate 28 is mounted onto base plate 10, SAW resonator 28 or resonators 28 are electrically connected to leadthroughs 24.1 and 24.2 by a gold wire bonding process (not shown). Instead of connecting SAW resonators 28 to the leadthroughs 24.1 and 24.2 by bonding with gold wire, aluminum wire can be used.

After SAW resonators 28 are wire-bonded to leadthroughs 24.1 and 24.2 the package is completed by bonding or welding, preferably laser welding, lid part 30 to the assembly of base part 10 and central part 20. Lid-part 30 is preferably made from austenitic stainless steel.

The completed package can then be bonded to the structural component for which the strain is to be determined. The strain on the mating surface of the structural component, which is the result of direct loading of the component, e.g. by tension, compression, bending or torque or the result of a temperature change, is transferred to SAW substrate 28 elastically, i.e. without hysteresis, plastic or creep deformation.

Therefore base part 10, which in its most preferred embodiment consists of austenitic stainless steel AISI 304L, has to be manufactured from material which has previously been strain hardened (cold rolled) to have the elastic properties required for the linear transfer of the strain from the component via base part 10 into the SAW substrate 28.

Figure 4:
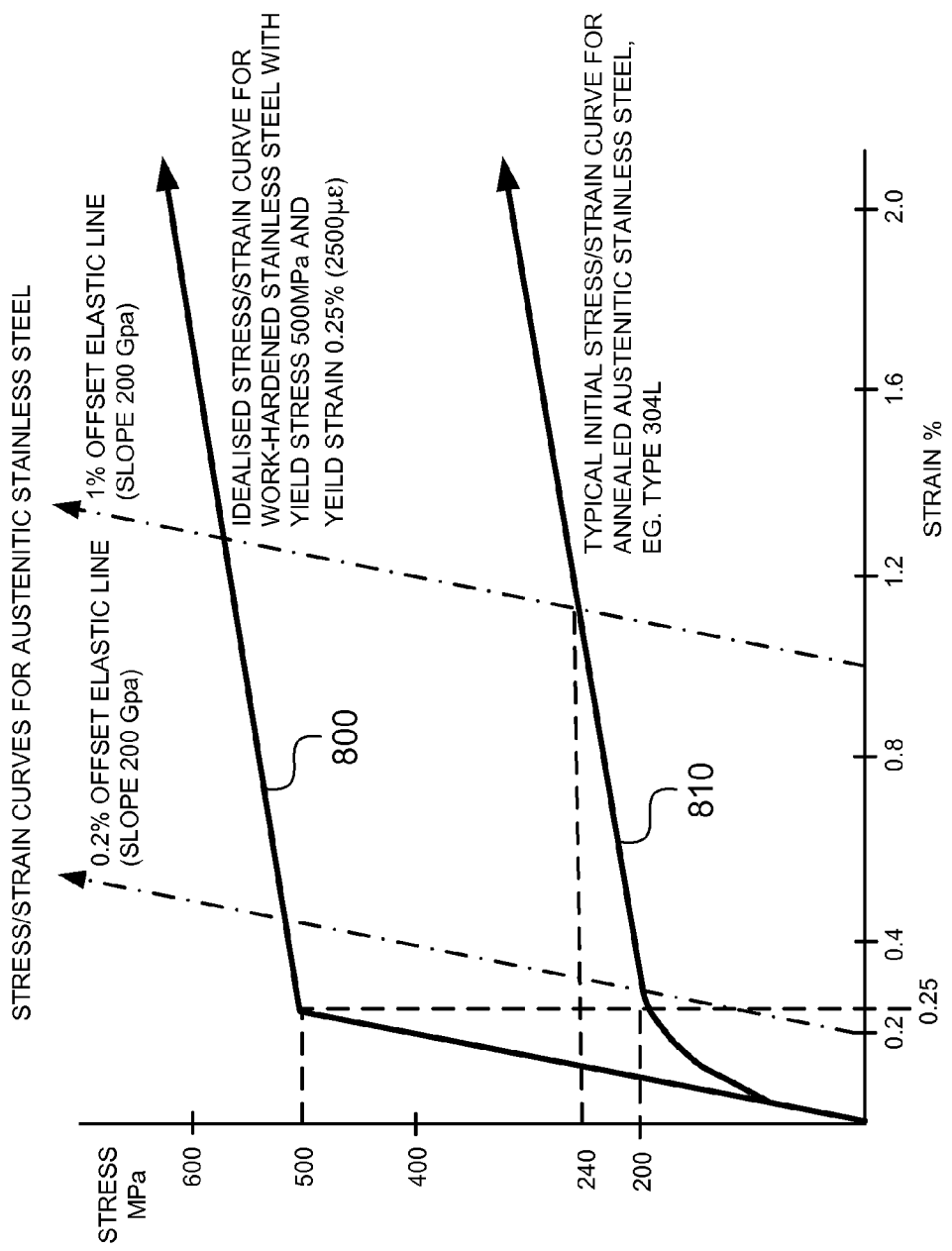
FIG. 4 illustrate stress/strain curves for austenitic stainless steel.

In FIG. 4, stress/strain curves representative of austenitic stainless steel e.g. type 304L are shown. Reference 800 denotes the tensile stress/strain curve for a work hardened stainless steel with a yield stress 500 MPa and a yield strain of 2,500 microstrain (0.25%). Reference 810 denotes the tensile stress/strain curve for an annealed austenitic stainless steel including the region of steadily increasing stress beyond about 200 MPa, which corresponds to strain hardening. The 0.2% and 1% offset elastic lines are drawn to ensure the stresses at their intersections with the stress-strain curve correspond to with the published stress values for AISI 304L.

If, as shown in Reference 810, tensile straining is continued up to a stress of around 500 MPa and then the direction of straining is reversed, the stress will reduce linearly to zero down a line parallel to the initial load line. On reloading, a new stress-strain curve will be generated similar in form to the curve in Reference 800. In other words the material will have been strain hardened so as to increase its range of linear elastic behavior to a new yield point of 500 MPa. This is the ideal material condition from which to manufacture the base part. If tensile straining were to continue, the stress-strain line would (as shown) sharply reduce in slope to continue strain hardening. In a typical tensile test, the test specimen will eventually form a neck, achieve its maximum level of stress, then rather quickly reduce in stress until it breaks.

It can also be clearly seen from FIG. 4 that by annealing previously strain hardened austenitic stainless steel the good elastic properties, i.e. the high yield point and linearity between stress and strain, get lost. While the stress/strain curve for a work hardened stainless steel may be linear up to a stress of 500 MPa with a yield strain of 0.25% (2,500 microstrain), the annealed material loses its elastic range to a large extent so that a base part manufactured from material in this condition is likely to result in a strain sensor which displays non linearity, hysteresis and creep. In another embodiment the work hardened stainless steel is linear up to a stress of 400 MPa and a yield strain of 0.20% (2,000 microstrain).

Preferred materials for the base part have a yield strain of more than 1,500 microstrain, especially more than 2,000 microstrain, most preferred more than 2,500 microstrain. In practice only the left hand side of the diagram up to about 0.2% strain (2,000 microstrain) is used by a SAW resonator located on the base plate of the package, but only in an extreme overload condition. The normal working strain would not normally exceed 0.05% (500 microstrain). As is clear from FIG. 4, if base part 10 and central part 20 are joined together, or are a single part before the high temperature glass fritting process is carried out, then base part 10 as well as central part 20 will become annealed and the base part will lose its good elastic properties. By making base part 10 and central part 20 separate and joining them together after leadthroughs 24.1 and 24.2 are introduced in central part 20 by a glass fritting process, the high yield strain of base part 10 is retained results in a major benefit to the measurement performance of the final complete sensor in terms of linearity, low hysteresis and creep.

Figure 2:
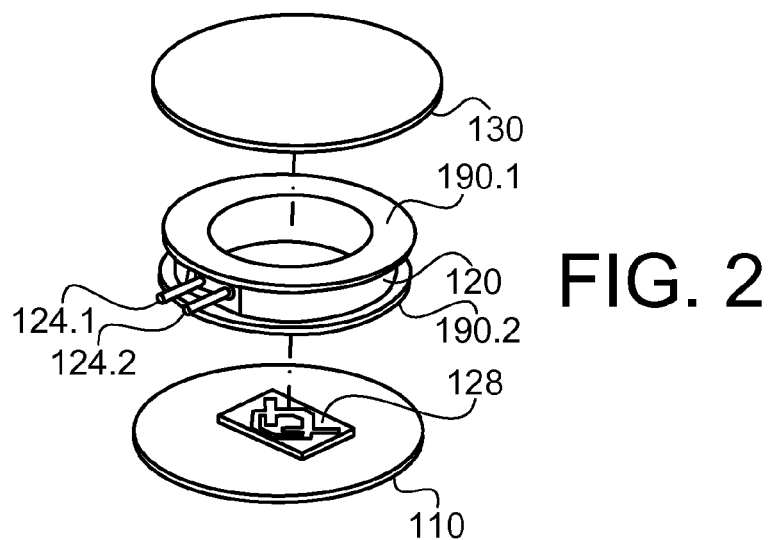
FIG. 2 is an exploded view of another embodiment of a package according to the present invention.

In FIG. 2 an embodiment of the invention is shown. All parts which correspond to similar parts in FIG. 1 are denoted with the same reference number plus 100.

In the embodiment shown in FIG. 2, the central part 120 includes two flanges 190.1 and 190.2. Flanges 190.1 and 190.2 are used in a welding process, to interconnect base part 110 as well as lid part 130 to central part 120. If a laser welding process is used, the heat affected zone due to the weld is small and does not extend to the region in which SAW-sensor 128 is attached to base part 110.

Lid-part 130 well as central part 120 is made of a material readily weldable or bondable and with good resistance to oxidation and corrosion such as an austenitic stainless steel. As already explained above, base part 110 is made of a material with good elastic properties such as, for example, strain hardened (cold rolled) austenitic stainless steel with a high elastic limit.

Figure 3:
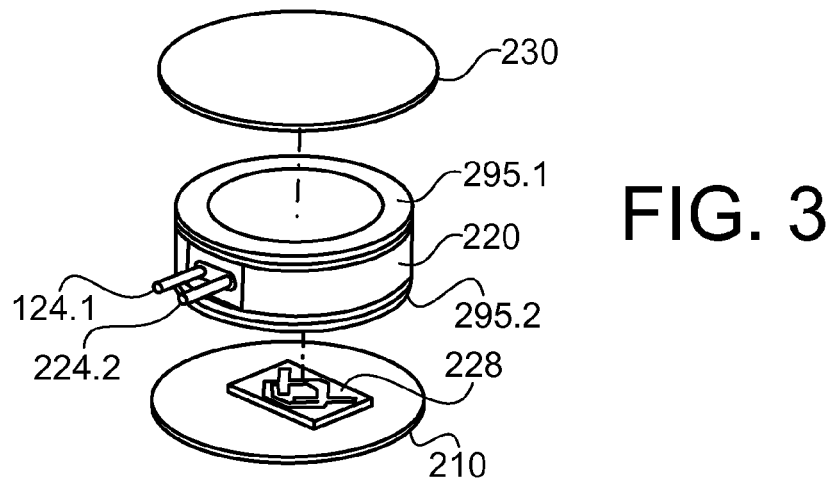
FIG. 3 is an exploded view of yet another embodiment of the present invention.

In FIG. 3 an alternative embodiment of the package according to the present invention is shown. Identical parts as in FIGS. 1 and 2 are denoted by the same reference numbers plus 200.

Instead of the flanges, central part 220 shown in FIG. 3 has only an upper ring 295.1 and a lower ring 295.2 with a contour identical to the contour of the central part 220. In the embodiment shown in FIG. 3 central part 220 is connected to lid part 230 and base part 210 by bonding. In the embodiment shown in FIG. 3 central part 220 is an annular component with a pair of circumferential slots, which are sufficiently deep to provide both thermal and mechanical decoupling. Such an embodiment has an advantage, in that central part 220 is thermally decoupled from the area in which the bonding is performed. Therefore when welding e.g. base part 210 and/or lid part 230 to central part 220 a lower amount of energy is needed for laser welding. Furthermore, central part 220 is mechanically decoupled from base part 210.

Figure 5:
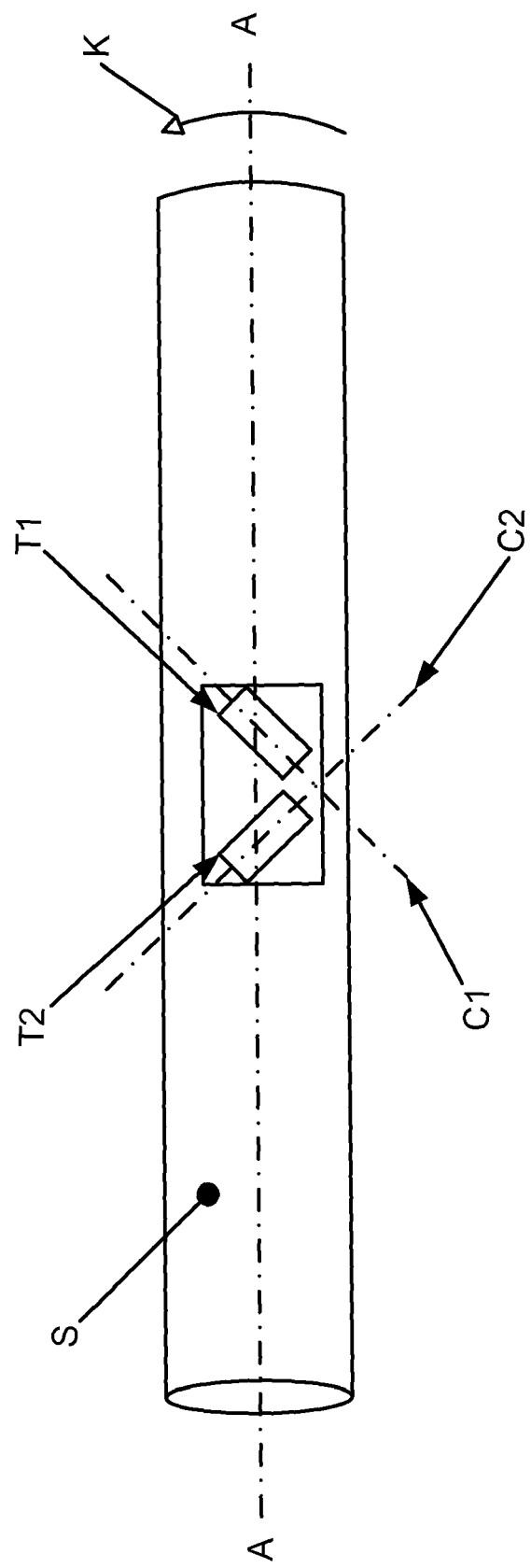
FIG. 5 is a view of an embodiment of a SAW-sensor for measuring a torque.

In FIG. 5, the principal of a torque-measurement with two SAW-resonator transducers T1 and T2 mounted on a shaft S are shown. Centerlines C1 and C2 are located at 45 degrees to a longitudinal axes A of shaft S from which the torque should be measured. Furthermore centerlines C1 and C2 are at right angles to one another. Torque is applied to the shaft in a clockwise direction is shown by an arrow K in FIG. 5, which will induce compressive strain in transducer T1 and tensile strain in transducer T2. Any temperature change would apply equally to both elements. If the geometry of transducers T1 and T2 is changed, for example by a torque, then the difference frequency between the SAW resonators arising from the change in shape can be measured. This is extensively described, for example, in U.S. Pat. No. 5,585,571, whose disclosure content is fully incorporated by reference in this application.

Figure 6:
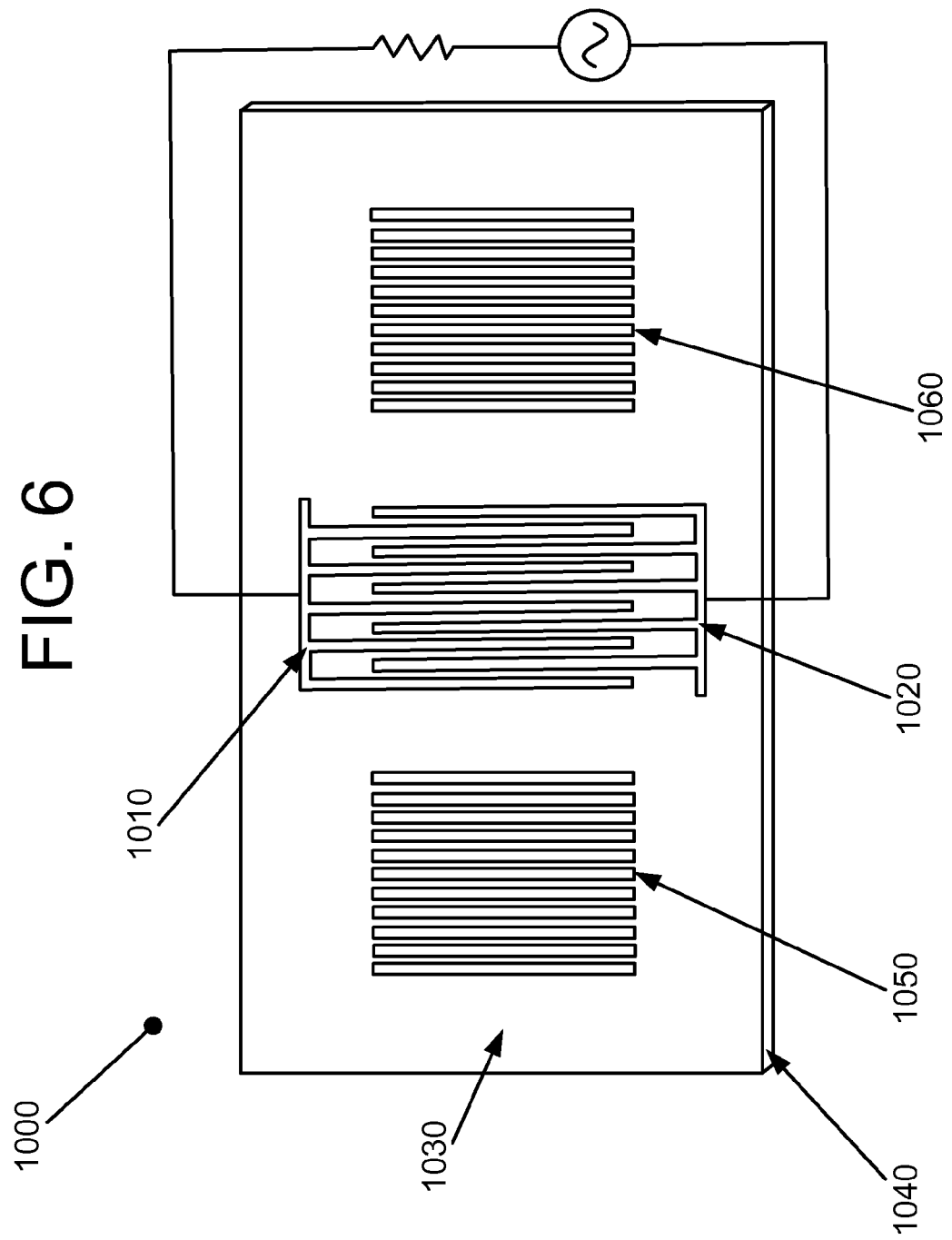
FIG. 6 is a schematic view of a one port resonator.

In FIG. 6 a detailed embodiment of a SAW-strain sensor, a so called SAW (Surface Acoustic Wave) resonator is shown. Such a resonator 1000 is made up of a conducting thin-film microstructure. Normally an aluminum film with a thickness of the order of 100 nm is used. The microstructure is formed by at least one interdigital transducer (IDT) consisting of two comb-like electrodes 1010 and 1020 deposited on the upper surface 1030 of a piezoelectric substrate 1040. The substrate can be made of a number of materials from flexible plastic polymers to hard materials such as ceramics, quartz, lithium niobate etc. Apart from the IDT, the microstructure may also contain two reflective gratings 1050 and 1060 positioned on each side of the transducer. The gratings consist of a number of periodically spaced reflecting elements (either thin metal strips or shallow grooves). The gratings enhance reflections of the SAW generated by the IDT and hence improve the quality (Q) factor of the resonator.

With the present invention, for the first time a package for a SAW-strain sensor consisting of three parts is provided. The package according to the invention is made of a single material and has therefore a common thermal expansion coefficient for all package elements. Furthermore it has good oxidation and corrosion resistance properties. The package, according to the present invention, can include conventionally fritted compression seals made of a glass material with a low thermal expansion coefficient between $9.6 \times 10^{-6}$ 1/K to $5.0 \times 10^{-6}$ 1/K. The expansion coefficient is given with regard to a temperature range from 20° C. to 300° C. according to DIN 52328.

Furthermore, the package provides for an elastic strain transfer from a structural component such as an automotive flexplate or driveshaft to the SAW strain sensor.

The SAW strain sensor according to the invention can be used in various fields such as torque sensors. The strain sensor according to the invention comprises the SAW substrate, including SAW resonator(s), and the hermetic package.

The invention provides for a small size strain sensor which has a low sensitivity to magnetic fields. Furthermore it provides for an extraordinary precision of measurements of static and dynamic loads.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A package for a strain sensor, comprising:
    a base part (10) with predefined elastic properties, said base part having no strain isolation cut therein;
    a central part (20); and
    a lid part (30).

2. The package for a strain sensor of claim 1, wherein said base part has a yield strain >1,000 microstrain, said base part being at least one of readily weldable and bondable to said central part.

3. The package for a strain sensor of claim 2, wherein said yield strain is >2,500 microstrain.

4. The package for a strain sensor of claim 2, wherein said base part is made of a material consisting of one of the following: strain hardened austenitic stainless steel, martensitic stainless steel, precipitation hardening stainless steel, ferritic steel, cold rolled steel and spring steel.

5. The package for a strain sensor of claim 4, wherein said material is readily glass frittable.

6. The package for a strain sensor of claim 5, wherein said material is annealed austenitic stainless steel.

7. The package for a strain sensor of claim 6, wherein said lid part is one of readily weldable and bondable to said central part.

8. The package for a strain sensor of claim 4, wherein said base part, said central part and said lid part are each made from said material with resistance to oxidation and corrosion and having a similar coefficient of thermal expansion.

9. The package for a strain sensor of claim 8, wherein said material is austenitic stainless steel.

10. The package for a strain sensor of claim 1, wherein said central part (20) includes at least one electrical leadthrough which is hermetically glass fritted to said central part (20).

11. The package for a strain sensor of claim 10, wherein said central part (20) is attached to said base part (10) by one of bonding and welding.

12. The package for a strain sensor of claim 11, further comprising a SAW-substrate (28), said SAW-substrate having at least one resonator, said SAW-substrate being bonded to said base part.

13. The package for a strain sensor of claim 12, wherein said SAW-substrate (28) includes the strain sensor.

14. The package for a strain sensor of claim 13, wherein said SAW-substrate includes at least one SAW-resonator that is electrically connected to said at least one electrical leadthrough.

15. The package for a strain sensor of claim 1, wherein said central part is attached to said lid part (30) by one of welding and bonding.

16. A method of producing a package for a strain sensor, comprising the steps of:
    providing a base part (10), a central part (20), a lid part (30), at least one leadthrough and a SAW-sensor (28);
    glass fritting said at least one leadthrough through a side of said central part (20) thereby providing a compression seal;
    attaching said central part (20) to said base part by one of bonding and welding;
    bonding said SAW-sensor to said base part (10) after said attaching said central part step;
    electrically connecting said SAW-sensor to said at least one leadthrough;
    attaching said lid-part (30) to the assembly of said base part and said central part (20).

17. The method of claim 16, wherein said glass fritting step includes applying a temperature in the region of 800 to 1100° C. to said at least one leadthrough (24.1, 24.2) and to said central part (20).

18. The method of claim 17, wherein said temperature is between 900 and 1050° C.

19. The method of claim 18, wherein said temperature is between 950 and 1020° C.

20. The method of claim 16, wherein said bonding step includes bonding said SAW-sensor (28) to said base part (10) using a high strength and high glass transition temperature (Tg) adhesive.

21. A strain sensor system, comprising:
    a package for a strain sensor, including:
    a base part (10) with predefined elastic properties;
    a central part (20); and
    a lid part (30); and
    a strain sensor (28) enclosed in said package and attached to said base part (10) of said package, said base part having no cut therein to isolate said strain sensor.

22. The strain sensor system of claim 21, wherein the strain sensor system is incorporated as a part of at lease one of a torque splitter sensor, a torque sensor for electric power assisted steering (EPAS), a crankshaft or flexplate torque sensor, a transmission output torque sensor, a drive shaft torque sensor, a shear strain sensor for a range of engineering structural applications, and as a tension compression plus Poisson's ratio strain sensor for an engineering structural application.

23. A package for a strain sensor comprising:
a base part (10) with a high elastic yield strain of at least 1,500 microstrain in order to provide a linear measurement performance;
a central part (20); and
a lid part (30).

24. The package for a strain sensor of claim 23, wherein said base part has an elastic yield strain greater than one of 2000 microstrain, and 2500 microstrain.

25. The package for a strain sensor of claim 23, wherein said base part is readily weldable or bondable to said central part.

26. The package for a strain sensor of claim 25, wherein said base part is readily weldable or bondable to a structural component for which the strain is to be measured.

27. The package for a strain sensor of claim 26, wherein said base part is made from one of the following materials:
strain hardened austenitic stainless steel, preferably AISI 304L
martensitic stainless steel, preferably AISI 420
precipitation hardening stainless steel, preferably 17/4 PH or 17/7 PH.

28. The package for a strain sensor of claim 23, wherein said central part is made from a material which is readily glass frittable, preferably annealed austenitic stainless steel.

29. The package for a strain sensor of claim 28, wherein the central part (20) carries electrical leadthroughs which are hermetically glass fritted to the central part (20).

30. The package for a strain sensor of claim 23, wherein the central part (20) is attached to the base part (10) by bonding or welding.

31. The package for a strain sensor of claim 30, wherein the lid is made from austenitic stainless steel.

32. The package for a strain sensor of claim 31, wherein the package contains a SAW-sensor (28), including at least one resonator, said at least one resonator being bonded to the base part.

33. The package for a strain sensor of claim 32, wherein the central part is attached to the lid part (30) by welding or bonding.

34. The package for a strain sensor of claim 23, further comprising a strain sensor (28) enclosed in the package and attached to said base part (10) of the package.

35. The package for a strain sensor of claim 34, wherein the strain sensor in the package together is used for one or more of the following uses:
as a torque splitter sensor,
as a torque sensor for electric power assisted steering (EPAS),
as a crankshaft or flexplate torque sensor,
as a transmission output torque sensor,
as a drive shaft torque sensor,
as a shear strain sensor for a range of engineering structural applications, and
as a tension-compression plus Poisson's ratio strain sensor for a range of engineering structural applications.

36. A method of producing a package for a strain sensor, comprising the steps of:
glass fritting leadthroughs to a central part (20) thereby providing a compression seal;
attaching the central part (20) to a base part (10) by bonding or by welding;
bonding a strain sensor (28) to the base part (10) after the central part (20) has been attached to the base part (10);
electrically connecting the strain sensor to the leadthroughs; and
finally attaching the lid-part (30) to the assembly of the base part and the central part (20).

37. The method of claim 36, wherein the leadthroughs (24.1, 24.2) are fritted to the central part (20) at a temperature in the range of 800 to 1100° C.

38. The method of claim 37, wherein said temperature is in the range of between 900 and 1050° C.

39. The method of claim 38, wherein said temperature is in the range of between 950 and 1020° C.

40. The method of claim 36, wherein the strain sensor (28) is bonded to the base part (10) by a high strength and high glass transition temperature (Tg) adhesive.

* * * * *